US007403648B2

(12) United States Patent
Nakamura

(10) Patent No.: US 7,403,648 B2
(45) Date of Patent: Jul. 22, 2008

(54) APPARATUS FOR GENERATING THREE-DIMENSIONAL MODEL DATA

(75) Inventor: Takayuki Nakamura, Yamatokoriyama (JP)

(73) Assignees: Mori Seiki Co., Ltd., Nara (JP); Intelligent Manufacturing Systems International, Sacramento, CA (US)

( * ) Notice: Subject to any disclaimer, the term of this patent is extended or adjusted under 35 U.S.C. 154(b) by 828 days.

(21) Appl. No.: 10/720,110

(22) Filed: Nov. 25, 2003

(65) Prior Publication Data

US 2004/0107018 A1 Jun. 3, 2004

(30) Foreign Application Priority Data

Nov. 29, 2002 (JP) ............................. 2002-348669

(51) Int. Cl.
*G06K 9/00* (2006.01)
(52) U.S. Cl. ...................................... 382/141; 382/154
(58) Field of Classification Search ........................ None
See application file for complete search history.

(56) References Cited

U.S. PATENT DOCUMENTS

| 4,654,872 | A | | 3/1987 | Hisano et al. | |
|---|---|---|---|---|---|
| 5,854,679 | A | | 12/1998 | Bourgoin et al. | |
| 6,064,756 | A | * | 5/2000 | Beaty et al. | 382/146 |
| 6,173,070 | B1 | * | 1/2001 | Michael et al. | 382/145 |
| 6,226,416 | B1 | * | 5/2001 | Ohshima et al. | 382/289 |
| 6,614,928 | B1 | * | 9/2003 | Chung et al. | 382/154 |
| 7,027,963 | B2 | * | 4/2006 | Watanabe et al. | 703/1 |

FOREIGN PATENT DOCUMENTS

| EP | 1 310 338 A | 5/2003 |
|---|---|---|
| EP | 1 315 056 A | 5/2003 |

(Continued)

OTHER PUBLICATIONS

Faugeras et al., "Stereo Vision", XP002316574, Three-Dimensional Computer Vision: A Geometric Viewpoint, 1993, pp. 165-243 sections 6.1, 6.2, 6.8, 6.9, Cambridge, MA: MIT Press, U.S.
European Search Report dated Dec. 28, 2005 issued in corresponding European Application No. 03027310.6 filed Dec. 15, 2005.
Office Action from the Japanese Patent Office dated Aug. 28, 2007 in the corresponding Japanese Patent Application No. 2002-348669.

*Primary Examiner*—Matthew C Bella
*Assistant Examiner*—Alex Liew
(74) *Attorney, Agent, or Firm*—Westerman, Hattori, Daniels & Adrian, LLP.

(57) ABSTRACT

The invention relates to a three-dimensional model data generating apparatus which can generate efficiently and accurately three-dimensional model data of a structural member constituting a machine tool. A three-dimensional model data generating apparatus 1 has: X-, Y-, and Z-axis imaging mechanisms 21, 22, 23 each of which has two CCD cameras that are spaced apart from each other by a predetermined distance, and which image a structural member constituting a machine tool 10 in the respective directions of the X-, Y-, and Z-axes (three orthogonal axis directions), thereby generating two-dimensional image data; and a model data generating section 31 which generates three-dimensional model data including at least shape data which define a three-dimensional shape of the structural member on the basis of the generated two-dimensional image data.

2 Claims, 10 Drawing Sheets

FOREIGN PATENT DOCUMENTS

| | | |
|---|---|---|
| JP | 59-500932 | 5/1984 |
| JP | 06-161533 | 6/1994 |
| JP | 2001-154715 | 6/2001 |
| WO | WO 83/04114 | 11/1983 |

* cited by examiner

F I G. 2
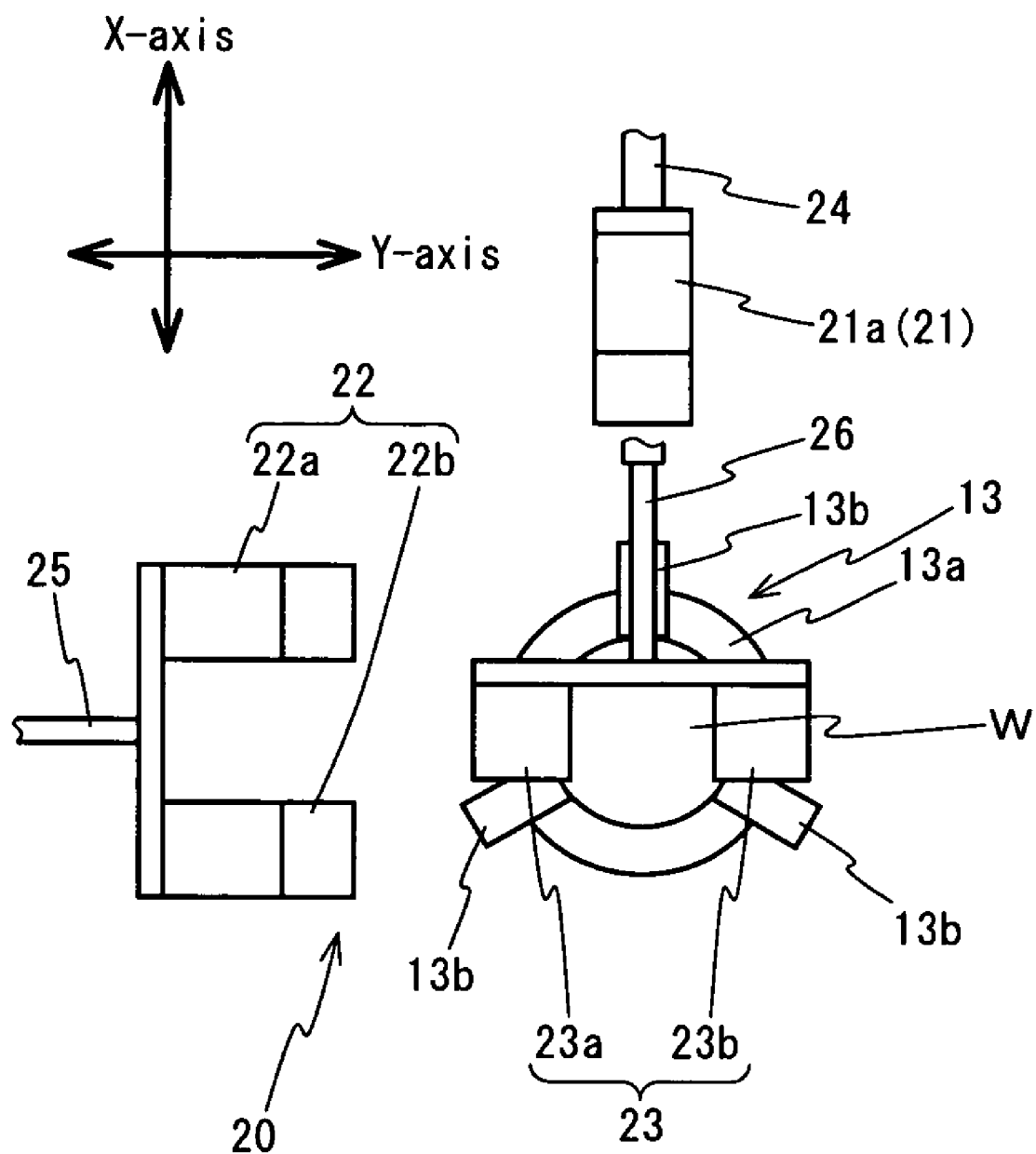

FIG. 4
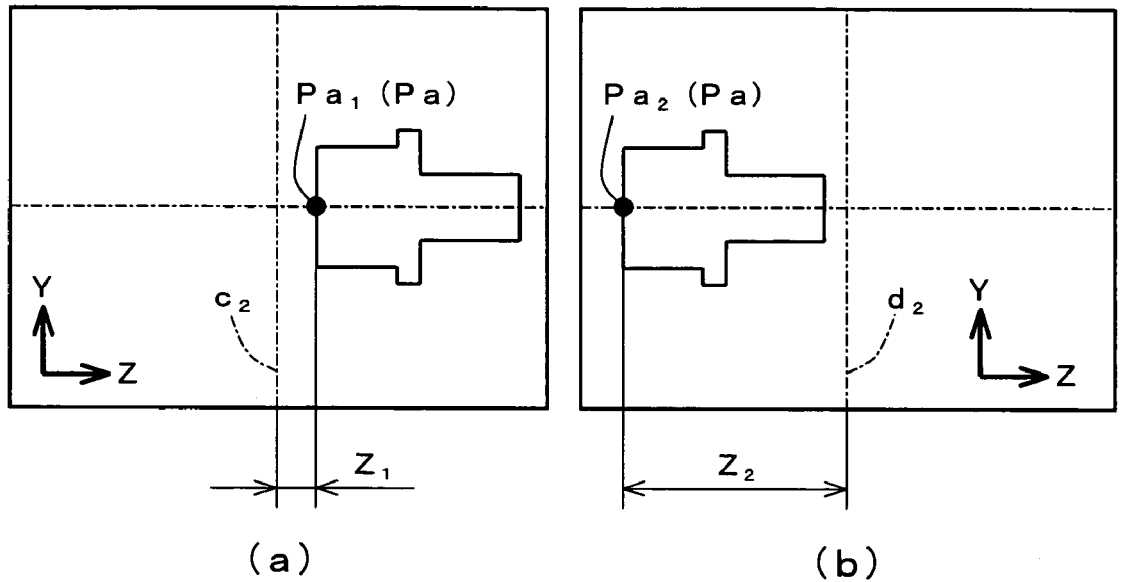
(a)  (b)
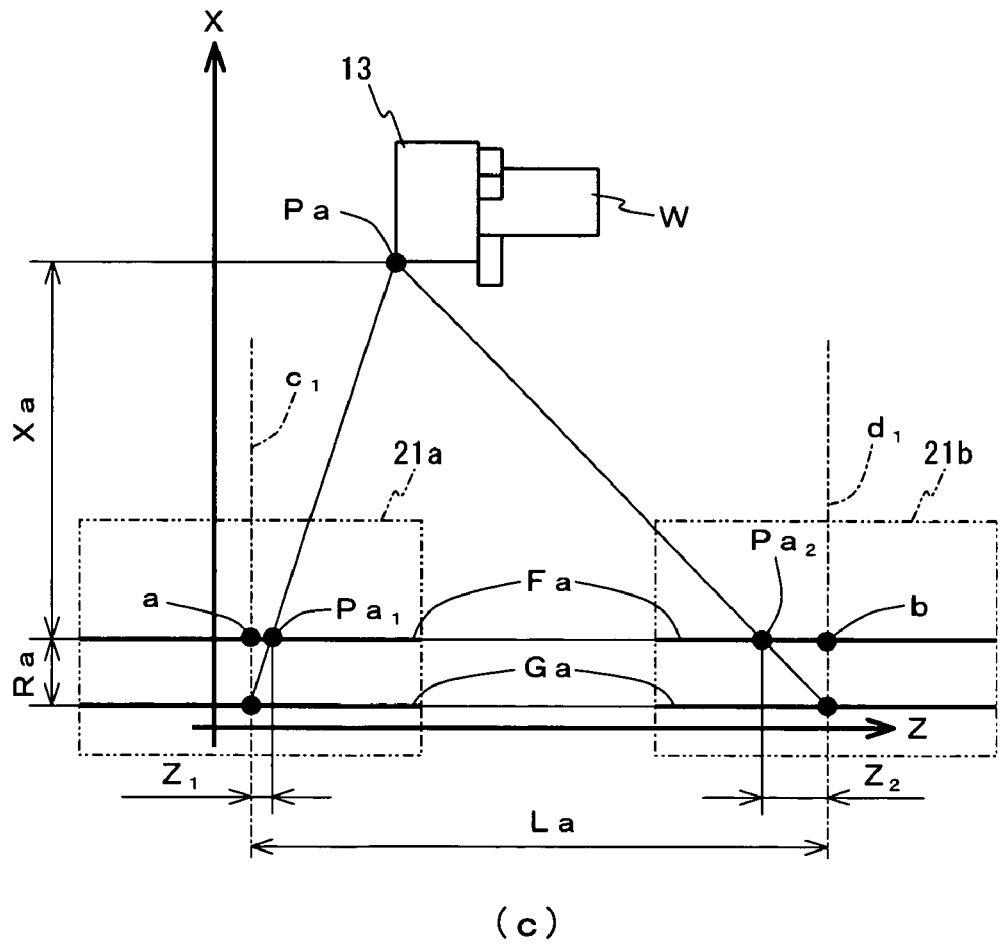
(c)

FIG. 5
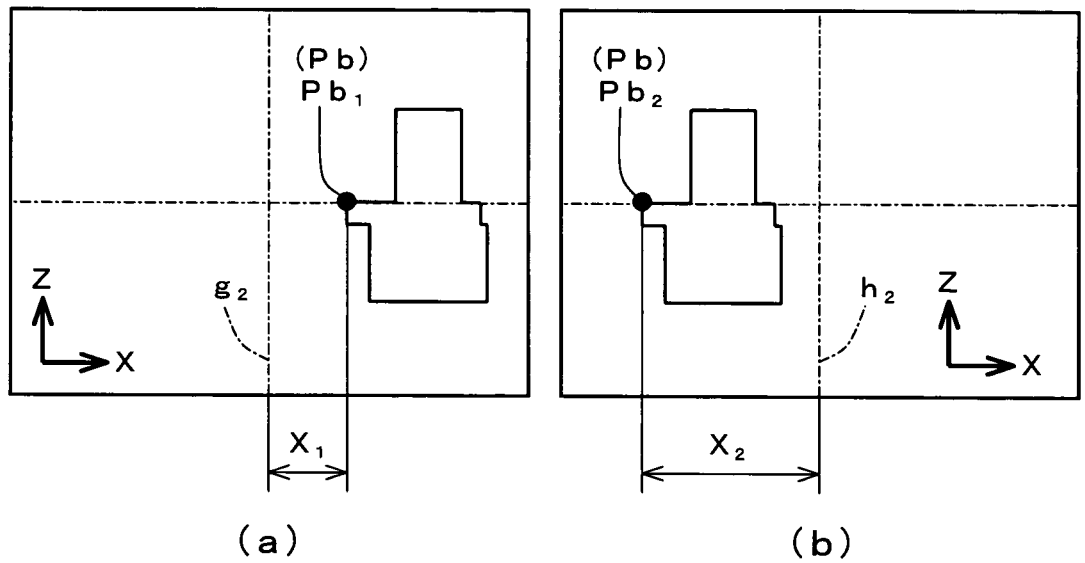
(a)          (b)
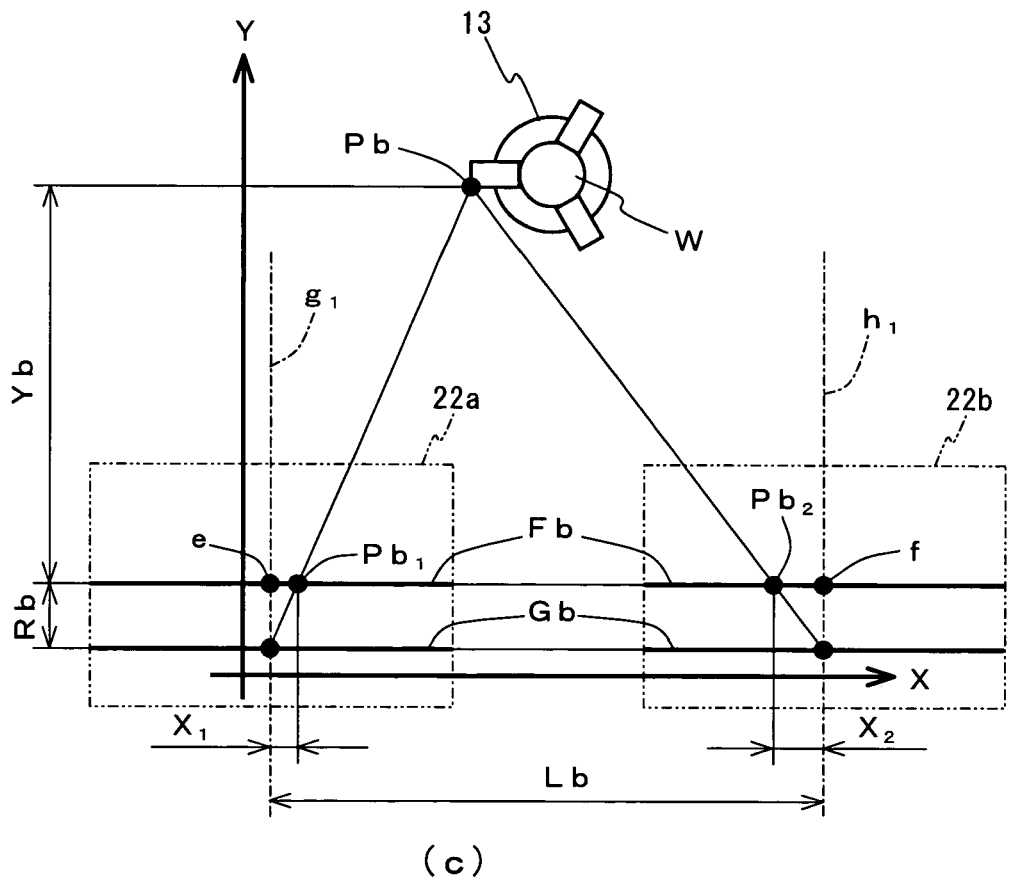
(c)

FIG. 6
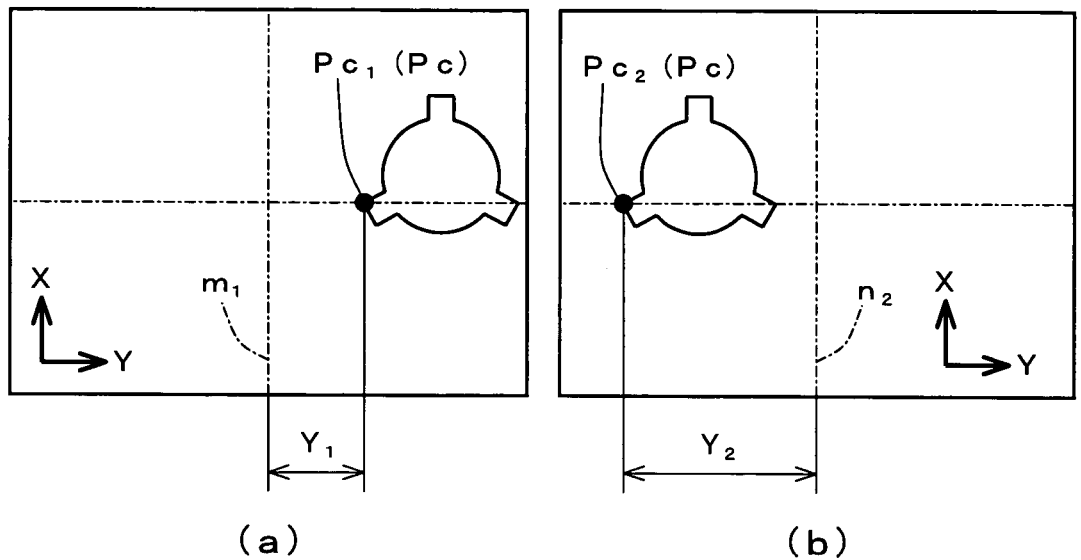
(a)  (b)
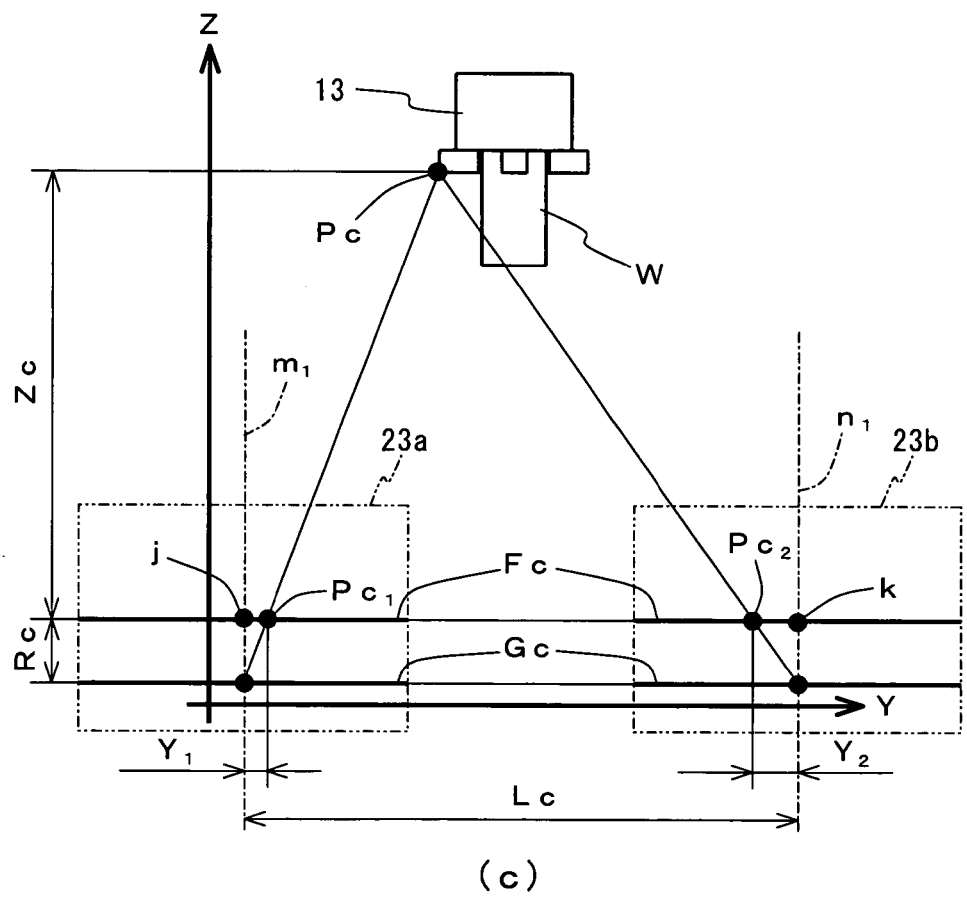
(c)

FIG. 11

| Axis data | Shape data | | | |
|---|---|---|---|---|
| C-axis | Plane | | Edge | |
| | Plane number | Edge number | Edge number | Vertex number |
| | F1 | E1, E2, E3, E4 | E1 | V1, V2 |
| | F2 | E5, E6, E7, E8 | E2 | V2, V3 |
| | F3 | E1, E9, E5, E10 | E3 | V3, V4 |
| | ...... | ...... | ...... | ...... |
| | Equation of plane | | Equation of edge | |
| | Plane number | Coefficient of equation | Edge number | Coefficient of equation |
| | F1 | A1, B1, C1, D1 | E1 | a1, b1, c1, d1 |
| | F2 | A2, B2, C2, D2 | E2 | a2, b2, c2, d2 |
| | F3 | A3, B3, C3, D3 | E3 | a3, b3, c3, d3 |
| | ...... | ...... | ...... | ...... |
| | Vertex coordinate | | | |
| | Vertex number | Coordinate | | |
| | | X | Y | Z |
| | V1 | X1 | Y1 | Z1 |
| | V2 | X2 | Y2 | Z2 |
| | V3 | X3 | Y3 | Z3 |
| | ...... | ...... | ...... | ...... |

APPARATUS FOR GENERATING THREE-DIMENSIONAL MODEL DATA

BACKGROUND OF THE INVENTION

1. Field of the Invention

The present invention relates to a three-dimensional model data generating apparatus for generating three-dimensional model data of a structural member constituting a machine tool in which a slide is movable in directions of at least first and second axes that are perpendicular to each other.

2. Description of the Prior Art

A machine tool is composed of various structural members such as: a chuck which holds a workpiece; a main spindle which axially rotates the chuck; a tool rest to which a tool is attached; and a drive mechanism which moves the tool rest in at least two orthogonal axial directions. Such a machine tool is configured so that the workpiece and the tool are relatively moved to machine the workpiece.

The operation of the drive mechanism is controlled by a controller on the basis of an NC program which is adequately prepared. If the NC program has an error, there is the possibility that an accident in which the tool and the workpiece interfere with each other occurs.

When an NC program is newly prepared, therefore, a trial machining is conducted on the basis of the NC program to check whether the NC program has an error or not. Recently, with using three-dimensional model data of a machine tool, an interference simulation is performed on a computer to check whether such an NC program has an error or not.

Such three-dimensional model data of a machine tool are configured while three-dimensional model data of plural structural members constituting the machine tool are correlated with one another. Three-dimensional model data of each structural member include at least shape data which define the three-dimensional shape of the structural member.

Usually, three-dimensional model data of a machine tool and structural members are adequately generated with using a three-dimensional CAD (Computer Aided Design) system by a CAD operator.

However, an interference simulation using three-dimensional model data which are generated in this way has the following problem. When the shape of a workpiece and that of a chuck for holding the workpiece are changed, for example, three-dimensional model data of the workpiece and the chuck must be newly generated, and three-dimensional model data of the whole of a machine tool must be corrected and updated with using the generated three-dimensional model data. As a result, there arises a problem in that the interference simulation cannot be quickly performed.

In a recent machining of workpiece, flexible production is conducted, and the workpiece shape to be machined is frequently changed. When three-dimensional model data of a workpiece and a chuck are newly generated for each change as described above, therefore, the productivity is very lowered.

Three-dimensional model data of a machine tool and structural members are sometimes caused to be different from their actual shapes by, for example, an error produced by a CAD operator. In this case, there is a problem in that an interference simulation cannot be correctly performed.

The invention has been conducted under the aforementioned circumstances. It is an object of the invention to provide an apparatus for generating three-dimensional model data which can generate efficiently and correctly three-dimensional model data of a machine tool and a structural member thereof in accordance with the actual state of the machine tool.

SUMMARY OF THE INVENTION

In order to attain the object, the invention provides an apparatus for generating three-dimensional model data of a structural member constituting a machine tool in which a slide is movable in directions of at least first and second axes that are perpendicular to each other, wherein the apparatus comprises: imaging means for imaging the structural member to generate image data; and model data generating means for, on the basis of the image data generated by the imaging means, generating three-dimensional model data including at least shape data which define a three-dimensional shape of the structural member.

Preferably, the imaging means is configured by first, second, and third imaging means, each of the imaging means comprising two imaging sections which are spaced apart from each other by a predetermined distance, the structural member being imaged by the imaging sections to generate two-dimensional image data. In this case, the first imaging means is configured so that the two imaging sections are arranged along the second axis or a third axis which is perpendicular to the first and second axes, and the imaging sections image the structural member in a direction of the first axis, the second imaging means is configured so that the two imaging sections are arranged along the first axis or the third axis, and the imaging sections image the structural member in a direction of the second axis, and the third imaging means is configured so that the two imaging sections are arranged along the first axis or the second axis, and the imaging sections image the structural member in a direction of the third axis.

The model data generating means generates three-dimensional model data of the structural member on the basis of sets of two two-dimensional image data, the sets being generated respectively by the first, second, and third imaging means.

In the apparatus for generating three-dimensional model data, first, a structural member constituting a machine tool is imaged by the first, second, and third imaging means in the directions (three orthogonal axis directions) of the first, second, and third axes, and two-dimensional image data each configured by gray-level data which are two-dimensionally arranged are generated. At this time, since each of the first, second, and third imaging means has the two imaging sections, two two-dimensional image data respectively corresponding to the two imaging sections are generated.

On the basis of the sets of two two-dimensional image data which are generated respectively by the first, second, and third imaging means, the three-dimensional model data including at least shape data which define the three-dimensional shape of the structural member are generated by the model data generating means.

Specifically, the model data generating means first binarizes by a predetermined threshold the two-dimensional image data which are generated respectively by the first, second, and third imaging means, to extract images corresponding to the structural member, and extracts shape lines corresponding to contour lines of the structural member on the basis of the extracted binarized images. As described above, two imaging sections are disposed in each of the first, second, and third imaging means, and the shape lines are extracted for the imaging sections, respectively.

Based on the two shape lines which are extracted respectively for the imaging means, coordinate positions of real contour lines of the imaged structural member in a three-dimensional space are calculated for each of the imaging directions of this imaging means by the triangulation method. The calculated coordinate positions are relative coordinate positions with respect to the imaging sections of the imaging means.

Next, on the basis of the coordinate positions of the real contour lines which are calculated for each imaging direction, and the relative positional relationships among the imaging sections of the imaging means, for example, a three-dimensional shape of the imaged structural member in which the real contour lines are edges, respectively is estimated, and three-dimensional model data including at least shape data which define the three-dimensional shape are generated.

The shape data are configured by data such as: vertex coordinate data indicating coordinates in the three-dimensional space of vertices constituting the three-dimensional shape of the imaged structural member; equation data of an edge which is formed by connecting two vertices with each other; edge data which correlate the edge with the two vertices; equation data of a plane surrounded by edges; and plane data which correlate the plane with the edges.

In the case where the machine tool is an NC lathe, the structural member constituting the machine tool is a bed, a spindle stock which is disposed on the bed, a main spindle which is rotatably supported on the spindle stock, a chuck which is attached to the main spindle, a saddle which is movably disposed on the bed, a tool rest which is disposed on the saddle, or the like. In the case where the machine tool is a machining center, the structural member is a bed, a column which is disposed on the bed, a spindle head which is movably supported on the column, a main spindle which is rotatably supported on the spindle head, a table which is movably disposed on the bed, or the like.

As described above, in the apparatus for generating three-dimensional model data, a structural member constituting a machine tool is imaged in three orthogonal directions, and three-dimensional model data of the structural member are automatically generated on the basis of two-dimensional image data which are obtained as a result of the imaging. Therefore, it is possible to efficiently generate correct three-dimensional model data.

When an interference simulation is performed with using the thus generated correct three-dimensional model data, a precision simulation can be performed quickly and efficiently.

The apparatus for generating three-dimensional model data may be configured in the following manner. The apparatus further comprises model data storing means for previously storing three-dimensional model data of a whole of the machine tool in which three-dimensional model data of plural structural members constituting the machine tool are correlated with one another, and the model data generating means generates three-dimensional model data of a structural member which is imaged by the first, second, and third imaging means, on the basis of two-dimensional image data that are generated for the imaged structural member, calculates a coordinate position at which the imaged structural member is to be positioned on a three-dimensional model of the whole of the machine tool, and updates the three-dimensional model data of the whole of the machine tool on the basis of the calculated coordinate position data, the three-dimensional model data of the imaged structural member, and the three-dimensional model data of the whole of the machine tool which are stored in the model data storing means, thereby generating three-dimensional model data of the whole of the machine tool including the imaged structural member.

According to the apparatus for generating three-dimensional model data, three-dimensional model data of the whole machine tool in which three-dimensional model data of plural structural members constituting the machine tool are correlated with one another are previously stored into the model data storing means. In the case where the machine tool is an NC lathe, for example, three-dimensional model data of a bed and those of a tool rest and a spindle stock, three-dimensional model data of the spindle stock and those of a main spindle, three-dimensional model data of the main spindle and those of a chuck, three-dimensional model data of the chuck and those of a workpiece, and the like are correlated with one another to constitute the three-dimensional model data of the whole machine tool. The three-dimensional model data of the whole machine tool are stored into the model data storing means.

On the basis of two-dimensional image data of a structural member which is imaged by the first, second, and third imaging means, three-dimensional model data of the imaged structural member are then generated in the manner described above. A coordinate position at which a three-dimensional model of the imaged structural member is to be positioned in a three-dimensional model of the whole machine tool is then calculated based on relative positional relationships among the imaging sections of the imaging means and the machine tool.

On the basis of the calculated coordinate position data, the three-dimensional model data of the imaged structural member, and the three-dimensional model data of the whole machine tool stored in the model data storing means, the three-dimensional model data of the whole machine tool stored in the model data storing means are then updated to generate three-dimensional model data of the whole of the machine tool in which the three-dimensional model data of the imaged structural member are placed. Specifically, in the case where the three-dimensional model data of the imaged structural member do not exist in the three-dimensional model data of the whole machine tool stored in the model data storing means, three-dimensional model data of the whole machine tool to which the three-dimensional model data of the imaged structural member are added are generated. In the case where three-dimensional model of another structural member exist at a place where the three-dimensional model of the imaged structural member are to exist, the three-dimensional model data of the other structural member are deleted, and three-dimensional model data of the whole machine tool to which the three-dimensional model data of the imaged structural member are added are then generated.

As a result, according to the apparatus for generating three-dimensional model data, correct three-dimensional model data of an imaged structural member can be efficiently generated, and three-dimensional model data of the whole machine tool including the imaged structural member can be updated and generated correctly (i.e., so as to coincide with the actual state of the machine tool) and efficiently.

Preferably, the three-dimensional model data of the structural member include information related to a movement axis and/or a rotation axis which is set with respect to the structural member. In the case where the imaged structural member is a tool rest, for example, three-dimensional model data of the tool rest are configured so as to include information that the tool rest is moved along the axis of the main spindle. In the case where the imaged structural member is a chuck, three-dimensional model data of the chuck are configured so as to include information that the chuck is axially rotated. According to the configuration, the manner in which the imaged structural member is to be moved or rotated in the machine tool can be defined, and hence the three-dimensional model data are more suitable for an interference simulation.

BRIEF DESCRIPTION OF THE DRAWINGS

FIG. 2 is a sectional side elevation view looking in the direction of the arrow A-A in Fig.

FIGS. 4 to 9 are diagrams illustrating generation of three-dimensional model data; and FIGS. 10 and 11 are diagrams illustrating the configuration of three-dimensional model data.

DESCRIPTION OF THE PREFERRED EMBODIMENT

Figure 1:
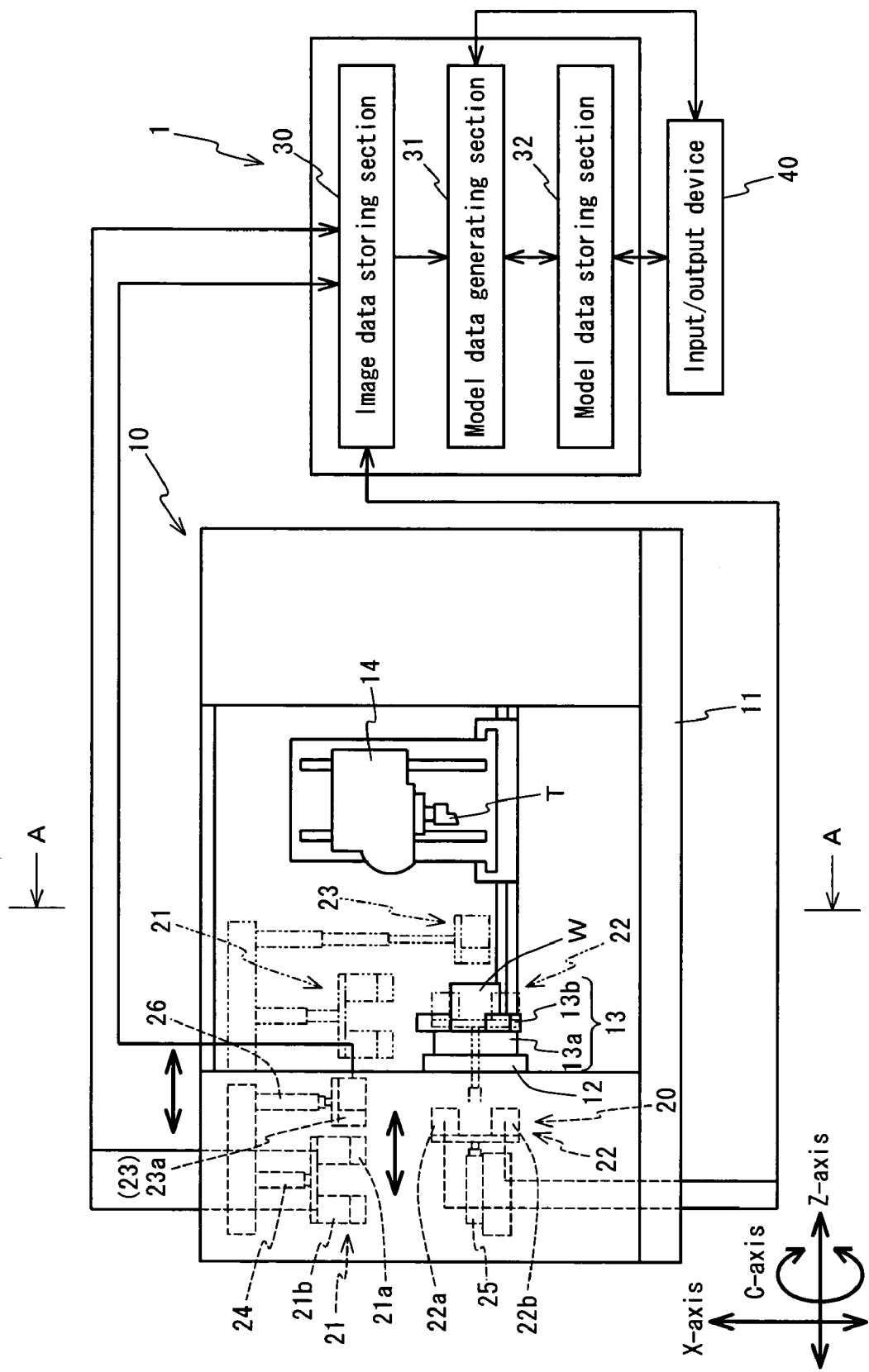
FIG. 1 is a block diagram schematically showing the configuration of an apparatus for generating three-dimensional model data of an embodiment of the invention.

Hereinafter, a preferred embodiment of the invention will be described with reference to the accompanying drawings. FIG. 1 is a block diagram schematically showing the configuration of an apparatus for generating three-dimensional model data of an embodiment of the invention, and FIG. 2 is a side section view looking in the direction of the arrow A-A in FIG. 1.

As shown in FIG. 1, the three-dimensional model data generating apparatus 1 of the embodiment comprises: an imaging device 20 which is mounted on a machine tool 10, and which images a structural member constituting the machine tool 10 to generate two-dimensional image data; an image data storing section 30 which stores the two-dimensional image data of the structural member that are generated by the imaging device 20; a model data generating section 31 which generates three-dimensional model data of the imaged structural member on the basis of the two-dimensional image data stored in the image data storing section 30; a model data storing section 32 which stores three-dimensional model data of the whole of the machine tool 10; and an input/output device 40 which is connected to the model data generating section 31 and the model data storing section 32.

In the embodiment, the machine tool 10 is an NC lathe, and configured by various structural members such as: a bed 11; a spindle stock (not shown) which is disposed on the bed 11; a main spindle 12 which is supported on the spindle stock (not shown) so as to be rotatable (in the C-axis direction) about the Z-axis (the axis which is parallel to the axis of the main spindle 12); a chuck 13 which is attached to the main spindle 12; and a tool rest 14 which is disposed on the bed 11 so as to be movable in the directions of the three orthogonal axes (the X-, Y-, and Z-axes). The chuck 13 is composed of a body unit 13a, and a plurality of gripping jaws 13b attached to the body unit 13a.

Figure 7:
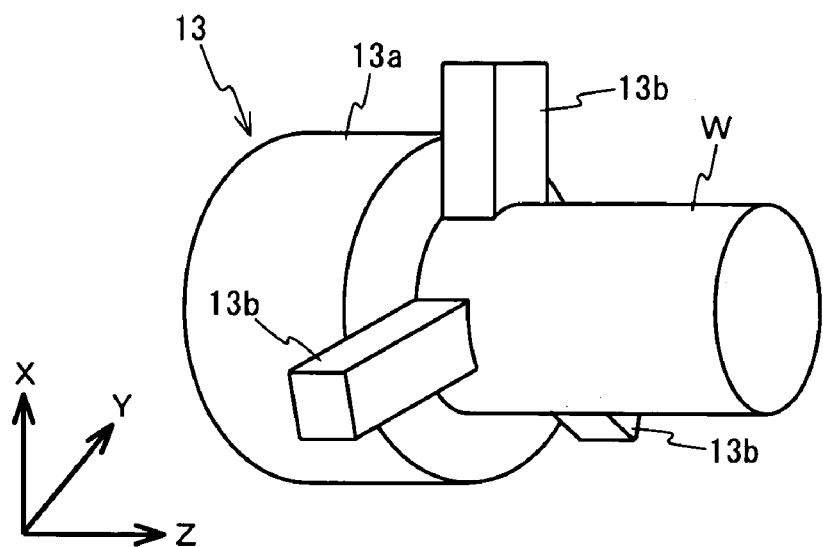

As shown in FIGS. 1 and 2, the imaging device 20 is configured by: an X-axis imaging mechanism 21 comprising two CCD cameras 21a, 21b which are spaced apart from each other by a predetermined distance; a Y-axis imaging mechanism 22 comprising two CCD cameras 22a, 22b which are similarly spaced apart from each other by a predetermined distance; and a Z-axis imaging mechanism 23 comprising two CCD cameras 23a, 23b which are similarly spaced apart from each other by a predetermined distance. In the embodiment, the chuck 13 which grips a workpiece W shown in FIG. 7 is an object to be imaged.

The X-axis imaging mechanism 21 is configured so that the CCD cameras 21a, 21b are arranged along the Z-axis to image the chuck 13 and the workpiece W in the direction along the X-axis, the Y-axis imaging mechanism 22 is configured so that the CCD cameras 22a, 22b are arranged along the X-axis to image the chuck 13 and the workpiece W in the direction along the Y-axis, and the Z-axis imaging mechanism 23 is configured so that the CCD cameras 23a, 23b are arranged along the Y-axis to image the chuck 13 and the workpiece W in the direction along the Z-axis.

When an imaging process is not to be performed, the X-axis imaging mechanism 21, the Y-axis imaging mechanism 22, and the Z-axis imaging mechanism 23 are stored at their respective retracting positions, and, when the imaging process is to be performed, moved by driving devices 24, 25, 26 from the retracting positions to imaging positions, respectively.

Each of the CCD cameras 21a, 21b, 22a, 22b, 23a, 23b comprises a plurality of photoelectric conversion elements which are two-dimensionally arranged in a multi-row, multi-column array, digitizes voltage signals which are output from the photoelectric conversion elements in accordance with the amount of received light, converts the digitized signals into gray level values, and outputs the values as two-dimensional gray-level image data which are arranged in the same manner as the arrangement of the photoelectric conversion elements.

The image data storing section 30 stores the two-dimensional gray-level image data which are output from the CCD cameras 21a, 21b, 22a, 22b, 23a, 23b.

Three-dimensional model data of the whole of the machine tool 10 which are adequately generated with using a three-dimensional CAD system or the like are previously stored via the input/output device 40 into the model data storing section 32. The three-dimensional model data of the whole of the machine tool 10 are configured so that three-dimensional model data of structural members constituting the machine tool 10 are correlated with one another. In the embodiment, for example, three-dimensional model data of the bed 11 and those of the tool rest 14 and the spindle stock (not shown), the three-dimensional model data of the spindle stock (not shown) and those of the main spindle 12, the three-dimensional model data of the main spindle 12 and those of the chuck 13, the three-dimensional model data of the chuck 13 and those of the workpiece W, and the like are correlated with one another to be generated as the three-dimensional model data of the whole machine tool 10. The generated three-dimensional model data are stored into the model data storing section 32.

Figure 10:
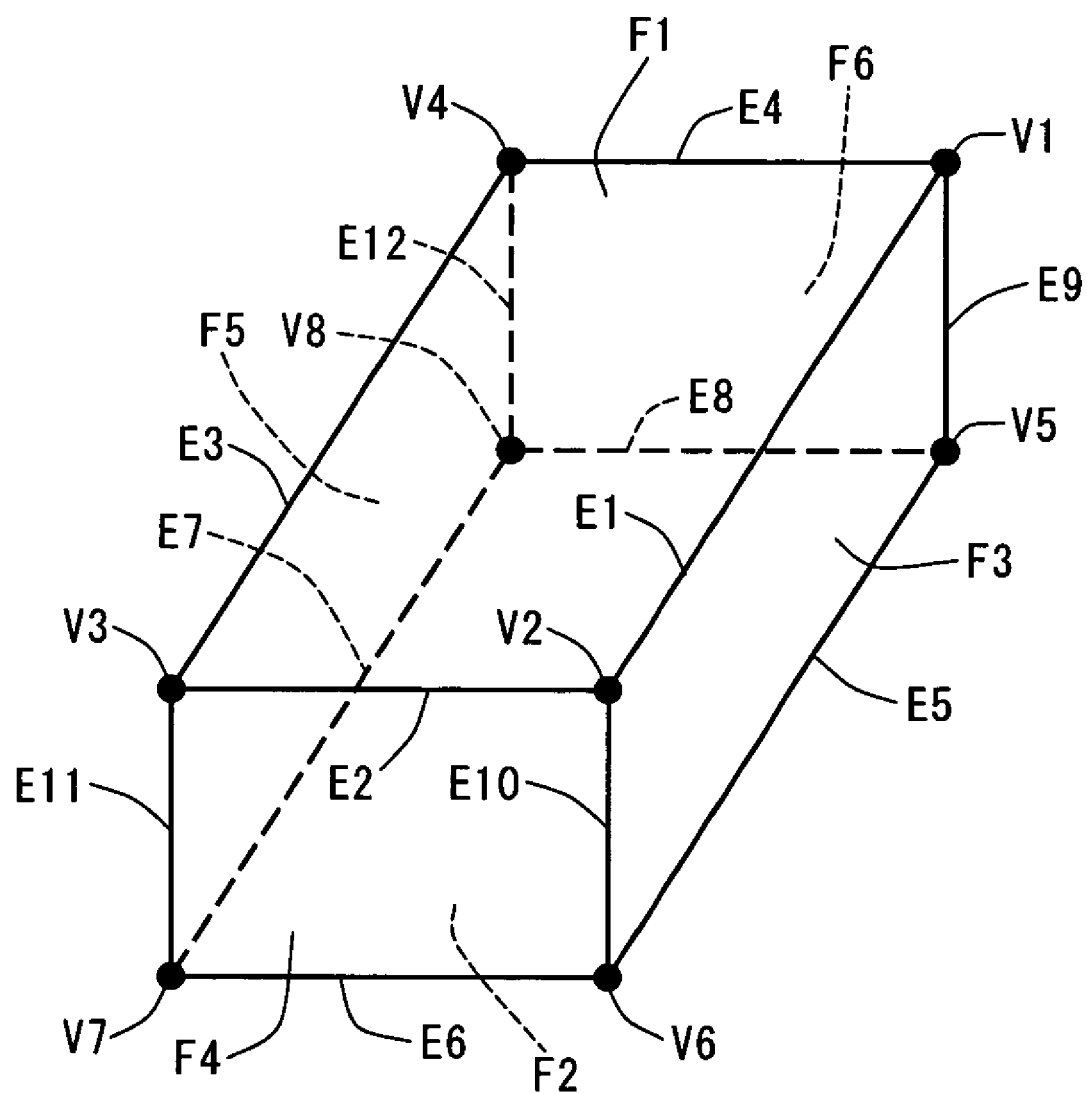

Each three-dimensional model data are configured so as to include at least shape data which define the three-dimensional shape of the structural member, and axis data related to a movement axis and/or a rotation axis which is set with respect to the structural member. The shape data are configured by: vertex coordinate data indicating coordinates in the three-dimensional space of vertices constituting the three-dimensional shape of the structural member; equation data of an edge which is formed by connecting two vertices with each other; edge data which correlate the edge with the two vertices; equation data of a plane surrounded by edges; plane data which correlate the plane with the edges; and other data. In the case where the three-dimensional shape is a shape shown in FIG. 10, for example, shape data shown in FIG. 11 are obtained. In the case of the tool rest 14, for example, the axis data relate to the X-, Y-, and Z-axes, and, in the case of the chuck 13, the axis data relate to the C-axis.

The model data generating section 31 generates three-dimensional model data which include at least shape data defining the three-dimensional shape of the chuck 13 and the workpiece W, on the basis of the two-dimensional gray-level image data stored in the image data storing section 30, calculates a coordinate position at which the chuck 13 and the workpiece W are to be positioned on a three-dimensional model of the whole of the machine tool 10, and updates the three-dimensional model data of the whole of the machine tool 10 on the basis of the calculated coordinate position data, the three-dimensional model data of the chuck 13 and the workpiece W, and the three-dimensional model data of the whole of the machine tool 10 which are stored in the model data storing section 32, thereby generating three-dimensional model data of the whole of the machine tool 10 including the chuck 13 and the workpiece W which are imaged.

Figure 3:
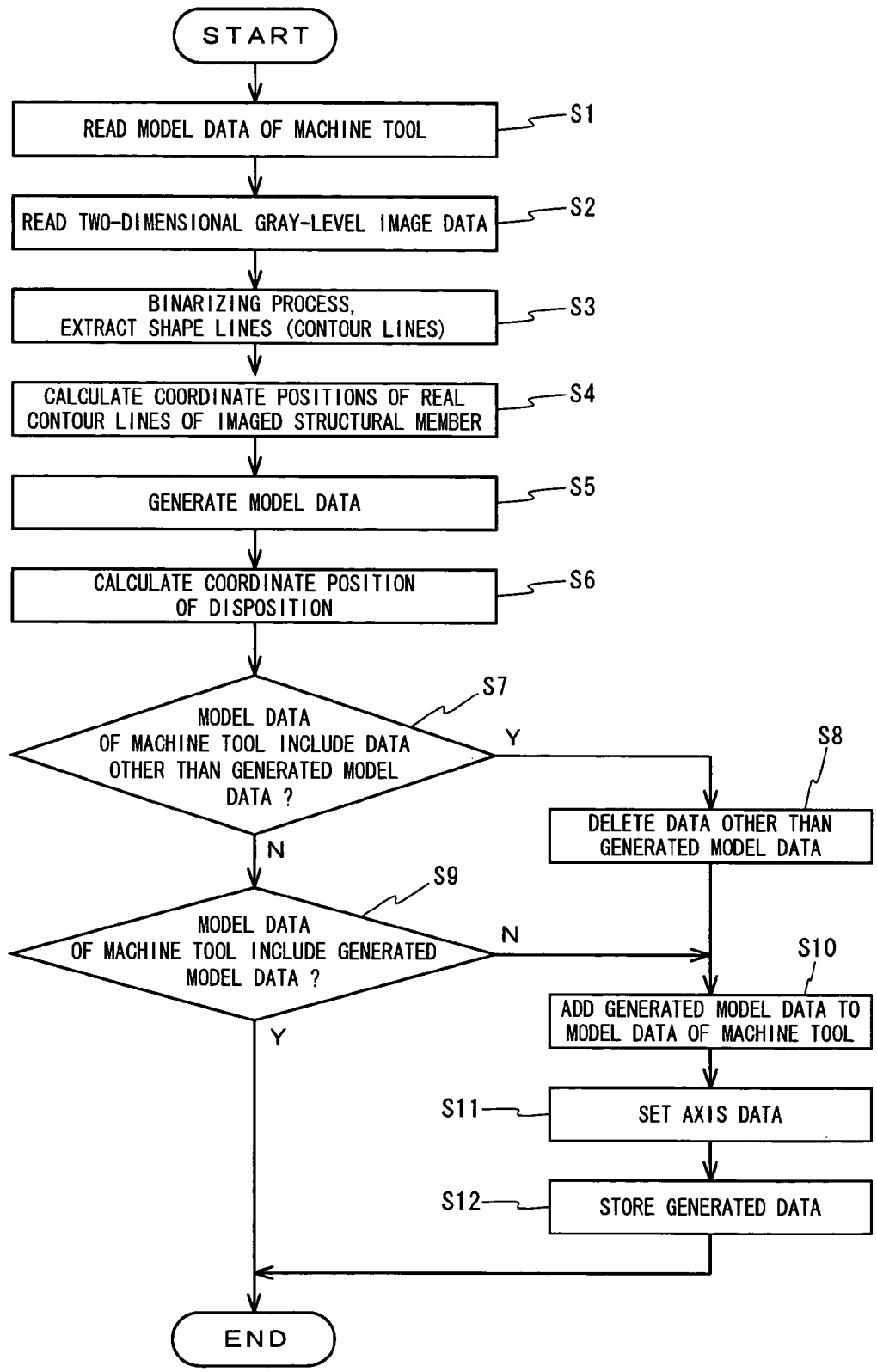
FIG. 3 is a flowchart showing a series of processes in a model data generating section in the embodiment.

Specifically, the model data generating section 31 performs processes shown in FIG. 3. It is assumed that the imaging device 20 images the chuck 13 gripping the workpiece W, and two-dimensional gray-level image data obtained by the imaging are stored in the image data storing section 30. Hereinafter, the workpiece W and the chuck 13 are referred to as the imaged structural member.

The model data generating section 31 first reads out the three-dimensional model data of the whole machine tool 10 stored in the model data storing section 32, from the model data storing section 32 (step S1), and reads out the two-dimensional gray-level image data of the imaged structural member stored in the image data storing section 30, from the image data storing section 30 (step S2).

The read out two-dimensional image data are binarized by a predetermined threshold to extract images of the imaged structural member, and the extracted binarized images are scanned in the raster direction to extract contour lines of the binarized images (step S3).

The contour lines of the binarized images which are obtained by the CCD cameras 21a, 21b are shown in (a) and (b) of FIG. 4, those of the binarized images which are obtained by the CCD cameras 22a, 22b are shown in (a) and (b) of FIG. 5, and those of the binarized images which are obtained by the CCD cameras 23a, 23b are shown in (a) and (b) of FIG. 6.

Based on the two contour lines which are extracted for each of imaging mechanisms of the X-axis imaging mechanism 21, the Y-axis imaging mechanism 22, and the Z-axis imaging mechanism 23, coordinate positions of real contour lines of the imaged structural member in a three-dimensional space are calculated for each of the imaging directions of the imaging mechanisms by the triangulation method (step S4). The calculated coordinate positions are relative coordinate positions with respect to the imaging mechanisms.

A technique of calculating the coordinate positions of the real contour lines of the imaged structural member in a three-dimensional space by the triangulation method will be briefly described.

For example, the two CCD cameras 21a, 21b which obtain the images shown in (a) and (b) of FIG. 4, and the entity of the imaged structural member are in the positional relationships in the X-Z plane shown in (c) of FIG. 4. In (c) of FIG. 4, Fa denotes the center planes of lenses of the CCD cameras 21a, 21b, and Ga denotes the image surfaces. In the figure, a denotes the lens center of the CCD camera 21a, and b denotes the lens center of the CCD camera 21b. Furthermore, Ra denotes the distance between the lens center plane Fa and the image surface Ga, and La denotes the distance between the lens centers a, b of the two CCD cameras 21a, 21b. These distances are previously accurately measured. In the figure, c1 and d1 denote axes which are parallel to the X-axis, and which pass the centers a, b, respectively.

A reference point in the entity of the imaged structural member is indicated by Pa, and lines respectively connecting points where the axes c1 and d1 intersect the image surface Ga, and the reference point Pa are set. The lines intersect the lens center plane Fa at points Pa1 and Pa2, respectively. Namely, light from the reference point Pa is received by the CCD cameras 21a, 21b intersects the respective lens center planes at the points Pa1 and Pa2 to be deflected by the respective lenses, and then further advances from the points Pa1 and Pa2 in parallel with the axes c1 and d1 to be imaged on the respective image surfaces. The points Pa1 and Pa2 correspond to portions which are in the contour line images of (a) and (b) of FIG. 4, and which are denoted by the same reference numerals, respectively.

When the distances Z1, Z2 between the imaged points of the reference point Pa on the image surfaces of the CCD cameras 21a, 21b, and the lens centers a, b are known, therefore, the distance Xa in the X-axis direction between the CCD cameras 21a, 21b and the entity of the imaged structural member can be calculated by the triangulation method with using Expression (1) below. The distances Z1, Z2 can be easily calculated from the contour line images of (a) and (b) of FIG. 4 which are imaged by the CCD cameras 21a, 21b and then processed. In the figure, c2 and d2 denote axes which are parallel to the Y-axis, and which pass the lens centers a, b, respectively.

$$Xa=Ra(La-Z1-Z2)/(Z1+Z2) \qquad (1)$$

As shown in FIGS. 5 and 6, also the distances between the CCD cameras 22a, 22b and the CCD cameras 23a, 23b, and the entity of the imaged structural member can be calculated in a similar manner as described above.

In FIG. 5, (c) is a diagram showing the positional relationships in the X-Y plane among the CCD cameras 22a, 22b and the entity of the imaged structural member. In the figure, Fb denotes the center planes of lenses of the CCD cameras 22a, 22b, Gb denotes the image surfaces, e denotes the lens center of the CCD camera 22a, and f denotes the lens center of the CCD camera 22b. Furthermore, Rb denotes the distance between the lens center plane Fb and the image surface Gb, Lb denotes the distance between the lens centers e, f of the CCD cameras 22a, 22b, and g1 and h1 denote axes which are parallel to the Y-axis, and which pass the centers e, f, respectively. In the figure, Pb denotes a reference point, Pb1 and Pb2 denote points where lines respectively connecting intersections of the axes g1, h1 in the image surfaces Gb and the reference point Pb intersect the lens center plane Fb, and X1, X2 denote distances between the imaged points of the reference point Pb on the image surfaces Gb of the CCD cameras 22a, 22b, and the lens centers e, f. In (a) and (b) of FIG. 5, g2 and h2 denote axes which are parallel to the Z-axis, and which pass the centers e, f, respectively.

Furthermore, (c) of FIG. 6 is a diagram showing the positional relationships in the Y-Z plane among the CCD cameras 23a, 23b and the entity of the imaged structural member. In the figure, Fc denotes the center planes of lenses of the CCD cameras 23a, 23b, Gc denotes the image surfaces, j denotes the lens center of the CCD camera 23a, and k denotes the lens center of the CCD camera 23b. The reference symbol Rc denotes the distance between the lens center plane Fc and the image surface Gc, Lc denotes the distance between the lens centers j, k of the CCD cameras 23a, 23b, and m1 and n1 denote axes which are parallel to the Z-axis, and which pass the centers j, k, respectively. In the figure, Pc denotes a reference point, Pc1 and Pc2 denote points where lines respectively connecting intersections of the axes m1, n1 in the image surfaces Gc and the reference point Pc intersect the lens center plane Fc, and Y1, Y2 denote distances between the imaged points of the reference point Pc on the image surfaces Gc of the CCD cameras 23a, 23b, and the lens centers j, k. In (a) and (b) of FIG. 6, m2 and n2 denote axes which are parallel to the X-axis, and which pass the centers j, k, respectively.

The distance Yb between the CCD cameras 22a, 22b and the entity of the imaged structural member, and the distance Zc between the CCD cameras 23a, 23b and the entity of the imaged structural member can be calculated with using Expressions (2), (3) below.

$$Yb=Rb(Lb-Z1-Z2)/(Z1+Z2) \quad (2)$$

$$Zc=Rc(Lc-Z1-Z2)/(Z1+Z2) \quad (3)$$

In this way, the coordinate positions of the real contour lines of the imaged structural member in a three-dimensional space are calculated.

Next, on the basis of the coordinate positions of the real contour lines which are calculated for each imaging direction, and the relative positional relationships among the CCD cameras 21a, 21b, 22a, 22b, 23a, 23b, a three-dimensional shape of the imaged structural member in which the real contour lines are edges, respectively is estimated, and three-dimensional model data including at least shape data which define the three-dimensional shape are generated (step S5).

Figure 8:
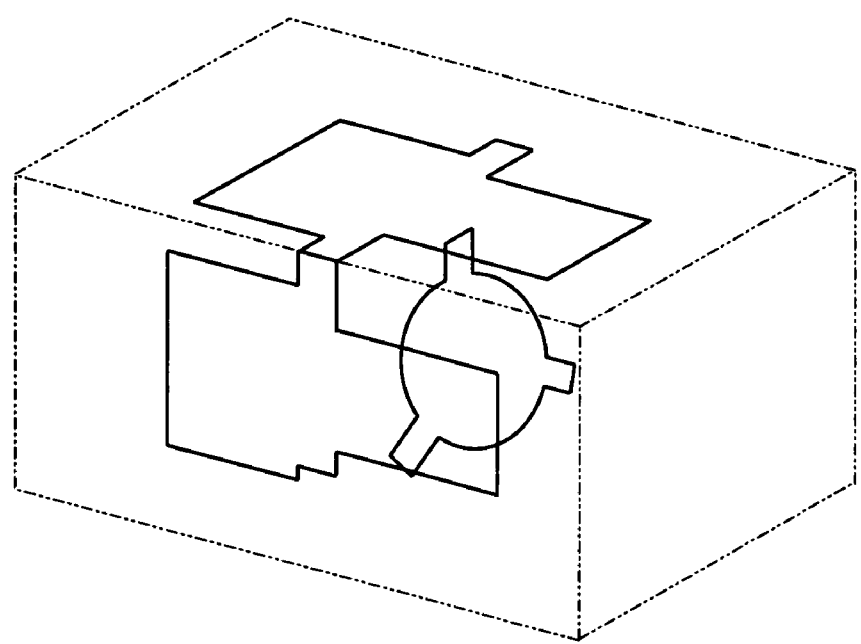

FIG. 8 is a conceptual diagram in which the real contour lines of the imaging directions are placed on the basis of the relative positional relationships among the CCD cameras 21a, 21b, 22a, 22b, 23a, 23b, and FIG. 7 shows the estimated three-dimensional shape of the imaged structural member.

Next, on the basis of the relative positional relationships among the CCD cameras 21a, 21b, 22a, 22b, 23a, 23b and the machine tool 10, a coordinate position at which a three-dimensional model of the imaged structural member is to be positioned on a three-dimensional model of the machine tool 10 is calculated (step S6).

Then, the three-dimensional model data of the machine tool 10 are updated on the basis of the calculated coordinate position data on the three-dimensional model of the machine tool 10, the three-dimensional model data of the imaged structural member, and the three-dimensional model data of the machine tool 10 which are read out in step S1 (steps S7 to S12).

Specifically, it is checked whether, on the three-dimensional model of the machine tool 10 which is read out in step S1, a three-dimensional model of another structural member exists at a place where the three-dimensional model of the imaged structural member is to exist or not (step S7). If a three-dimensional model of another structural member exists, the three-dimensional model data of the other structural member are deleted (step S8) and three-dimensional model data of the machine tool 10 to which the three-dimensional model data of the imaged structural member are added are generated (step S10). Thereafter, the axis data are added to the three-dimensional model data of the imaged structural member (step S11), and these data are stored into the model data storing section 32 (step S12).

Figure 9:
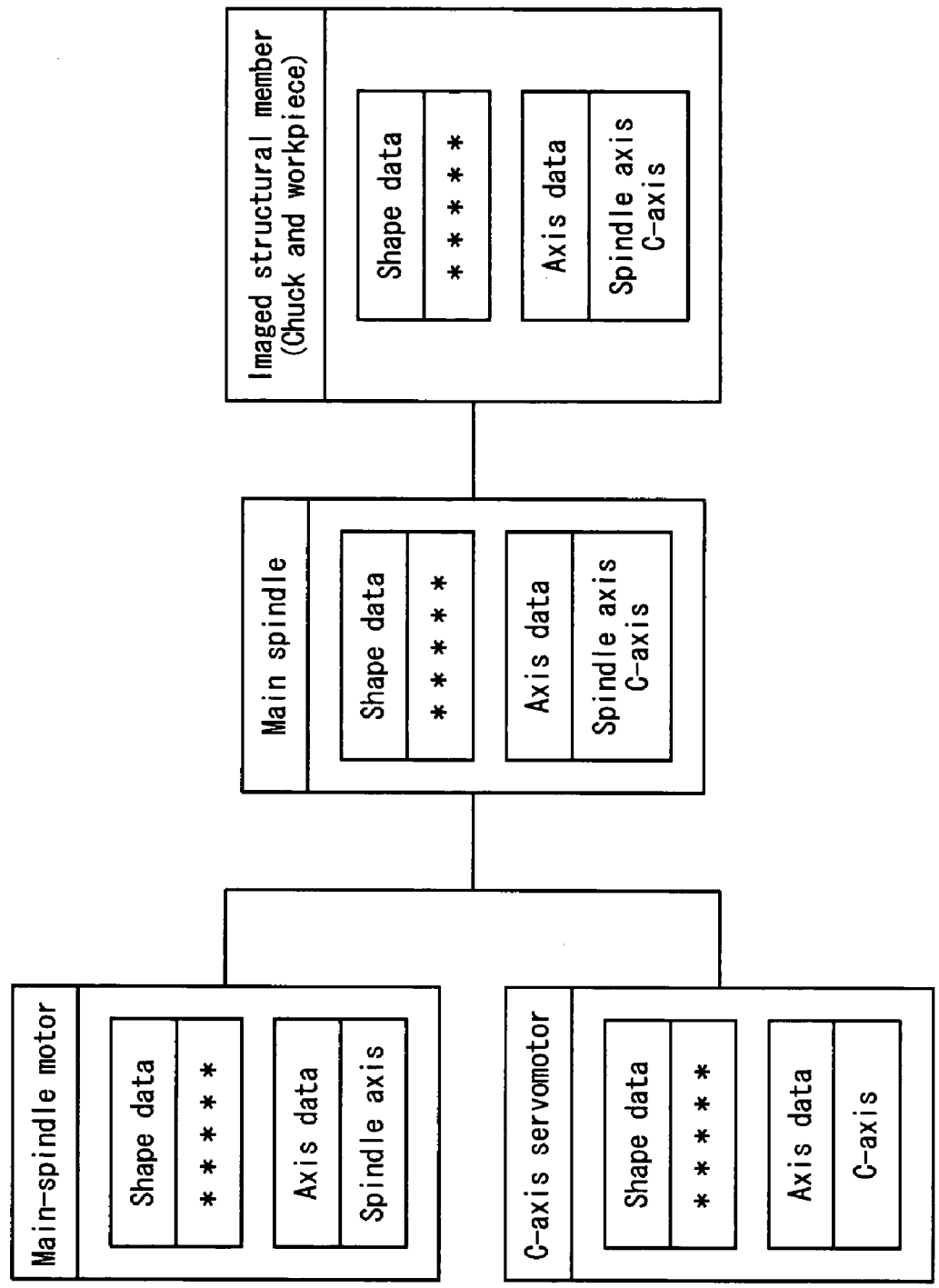

The unique axial data of the imaged structural member are input by an interactive input through the input/output device 40. When the imaged structural member is connected with another structural member, the connection relationships are automatically recognized, and the axis data related to the other structural member to be connected are automatically set as the axis data of the imaged structural member. As shown in FIG. 9, when the axis data of the main-spindle motor which axially rotates the main spindle are expressed as the spindle axis and those of a C-axis servomotor which rotationally feeds the main spindle about the axis by an arbitrary rotational speed are expressed as the C-axis, for example, the axis data of the main spindle which is to be connected with the main-spindle motor and the C-axis servomotor are automatically set as the spindle axis and the C-axis which are the axis data of the motors. Moreover, the axis data of the imaged structural member consisting of the chuck to be connected with the main spindle and the workpiece are automatically set as the spindle axis and the C-axis which are the axis data of the main spindle.

By contrast, if a three-dimensional model of another structural member does not exist, it is then judged whether the three-dimensional model data of the imaged structural member which are to be placed on the three-dimensional model of the machine tool 10 exist in the three-dimensional model data of the machine tool 10 that are read out in step S1 or not (step S9). If the three-dimensional model of the imaged structural member does not exist, the three-dimensional model data of the whole machine tool to which the three-dimensional model data of the imaged structural member are added are generated (steps S10, S11), and the generated three-dimensional model data are stored into the model data storing section 32 (step S12).

After the updating process of steps S7 to S12 are ended, the series of processes are completed.

In the thus configured three-dimensional model data generating apparatus 1 of the embodiment, when the object of to be machined is changed and the workpiece W, the chuck 13, and the like are exchanged in accordance with this change, for example, the new structural member is imaged in the directions of the X-, Y-, and Z-axes (three orthogonal axis directions) by the X-axis imaging mechanism 21, the Y-axis imaging mechanism 22, and the Z-axis imaging mechanism 23 of the imaging device 20, and two-dimensional image data of the axis directions are generated. The generated two-dimensional image data are stored into the image data storing section 30.

In the model data generating section 31, the two-dimensional image data stored in the image data storing section 30 are read out, the three-dimensional model data of the imaged structural member are generated on the basis of the read out two-dimensional image data, and, based on the generated three-dimensional model data of the imaged structural member, the three-dimensional model data of the machine tool 10 stored in the model data storing section 32 are updated.

As described above, in the three-dimensional model data generating apparatus 1, three-dimensional model data are automatically generated from images taken by the imaging device 20. Even when a structural member constituting the machine tool 10 is changed, therefore, three-dimensional model data of the whole of the machine tool 10 after the change can be generated correctly and efficiently.

When an interference simulation is performed with using the thus generated correct three-dimensional model data, a precision simulation can be performed quickly and efficiently.

In the above, an embodiment of the invention has been described above. It is a matter of course that specific modes in which the invention can be realized are not restricted to this.

Although the example in which the machine tool 10 is an NC lathe and the imaged structural member is the chuck 13 holding the workpiece W has been described, the invention is not restricted to such a configuration. The machine tool 10 includes various machine tools such as a machining center, and the imaged structural member includes various structural members constituting the machine tool 10, such as the tool rest 14 to which a tool T is attached, the main spindle holding a tool, and a table on which the workpiece W is placed.

In the embodiment, the CCD cameras 21a, 21b are arranged along the Z-axis, the CCD cameras 22a, 22b are arranged along the X-axis, and the CCD cameras 23a, 23b are arranged along the Y-axis. Alternatively, the CCD cameras 21a, 21b may be arranged along the Y-axis, the CCD cameras 22a, 22b maybe arranged along the Z-axis, and the CCD cameras 23a, 23b may be arranged along the X-axis.

In the embodiment, two CCD cameras are disposed along each of the X-, Y-, and Z-axes, or a total of six CCD cameras are disposed. The invention is not restricted to this configuration. Alternatively, two CCD cameras may be disposed along one of the X-, Y-, and Z-axes, and the cameras are sequentially moved so as to be disposed along the other two axes, so that the structural member is imaged in the directions of the three axes of the X-, Y-, and Z-axes by the two CCD cameras. More alternatively, a single CCD camera may be posed so as to be movable along the X-, Y-, and Z-axes, the structural member may be imaged from two places along each of the axes, and three-dimensional model data of the imaged structural member may be generated on the basis of the sets of two two-dimensional image data which are obtained for each of the axes.

What is claimed is:

1. An apparatus for generating three-dimensional model data of a structural member constituting a machine tool in which a slide is movable in directions of at least first and second axes that are perpendicular to each other, wherein said apparatus comprises:

first, second, and third imaging means, each of said imaging means comprising two imaging sections which are spaced apart from each other by a predetermined distance, said structural member being imaged by said imaging sections to generate two-dimensional image data; and model data generating means for generating three-dimensional model data including at least shape data which define a three-dimensional shape of said structural member, on the basis of sets of two two-dimensional image data which are generated respectively by said first, second, and third imaging means, said first imaging means is configured so that said two imaging sections are arranged along said second axis or a third axis which is perpendicular to said first and second axes, and said imaging sections image said structural member in a direction of said first axis, said second imaging means is configured so that said two imaging sections are arranged along said first axis or said third axis, and said imaging sections image said structural member in a direction of said second axis, and said third imaging means is configured so that said two imaging sections are arranged along said first axis or said second axis, and said imaging sections image said structural member in a direction of said third axis, wherein said apparatus further comprises model data storing means for previously storing three-dimensional model data of a whole of said machine tool in which three-dimensional model data of plural structural members constituting said machine tool are correlated with one another, and said model data generating means generates three-dimensional model data of a structural member which is imaged by said first, second, and third imaging means, on the basis of two-dimensional image data that are generated for said imaged structural member, calculates a coordinate position at which said imaged structural member is to be positioned on a three-dimensional model of the whole of said machine tool, and updates the three-dimensional model data of the whole of said machine tool on the basis of the calculated coordinate position data, the three-dimensional model data of said imaged structural member, and the three-dimensional model data of the whole of said machine tool which are stored in said model data storing means, thereby generating three-dimensional model data of the whole of said machine tool including said imaged structural member.

2. An apparatus for generating three-dimensional model data according to claim 1, wherein the three-dimensional model data of said structural member include information related to a movement axis and/or a rotation axis which is set with respect to said structural member.

* * * * *